United States Patent
Nakajima

(10) Patent No.: US 9,134,173 B2
(45) Date of Patent: Sep. 15, 2015

(54) RADIATION FAILURE INSPECTING METHOD AND RADIATION FAILURE INSPECTING APPARATUS

(75) Inventor: Mikito Nakajima, Ina (JP)

(73) Assignee: Seiko Epson Corporation, Tokyo (JP)

( * ) Notice: Subject to any disclaimer, the term of this patent is extended or adjusted under 35 U.S.C. 154(b) by 658 days.

(21) Appl. No.: 13/400,913

(22) Filed: Feb. 21, 2012

(65) Prior Publication Data

US 2012/0211664 A1    Aug. 23, 2012

(30) Foreign Application Priority Data

Feb. 22, 2011   (JP) .................................. 2011-036039

(51) Int. Cl.
*G01J 1/02*     (2006.01)
*G01J 1/42*     (2006.01)
*G03B 27/80*    (2006.01)

(52) U.S. Cl.
CPC .............. *G01J 1/4228* (2013.01); *G01J 1/0228* (2013.01); *G01J 1/429* (2013.01); *G03B 27/80* (2013.01)

(58) Field of Classification Search
CPC ....... G03B 27/80; G03B 27/16; G01J 1/4228; G01J 1/429; G01J 1/0228
USPC ........................... 250/372; 355/83; 399/51, 52
See application file for complete search history.

(56) References Cited

U.S. PATENT DOCUMENTS

| 6,219,140 B1 * | 4/2001 | Kaplan .................... 356/406 |
| 7,048,368 B2 | 5/2006 | Hirai |
| 2005/0068361 A1 | 3/2005 | Yokoyama |
| 2006/0083564 A1 | 4/2006 | Yazawa et al. |
| 2010/0049454 A1 * | 2/2010 | Irissou et al. ............ 702/58 |
| 2010/0321746 A1 | 12/2010 | Yazawa et al. |
| 2012/0068607 A1 * | 3/2012 | Farley ..................... 315/130 |
| 2014/0002869 A1 | 1/2014 | Takemoto et al. |

FOREIGN PATENT DOCUMENTS

| JP | 2004-082452 | 3/2004 |
| JP | 2006-205655 | 1/2005 |
| JP | 2005-104115 | 4/2005 |
| JP | 2005-125752 | 5/2005 |
| JP | 2005-246954 | 9/2005 |
| JP | 2010-212959 | 9/2010 |
| JP | 2010212959 A * | 9/2010 |

\* cited by examiner

*Primary Examiner* — Casey Bryant
(74) *Attorney, Agent, or Firm* — Workman Nydegger

(57) ABSTRACT

A radiation failure inspecting method includes acquiring read data when a scanner reads a radiation surface of a radiation unit in a state where a reading surface of the scanner faces the radiation surface of the radiation unit and the radiation unit emits light; acquiring a value corresponding to a radiation energy of the light from the radiation unit by integrating the read data in a direction corresponding to a predetermined direction on the read data; and determining that a radiation failure occurs in the radiation unit when the value corresponding to the radiation energy of the light is equal to or less than a threshold value.

7 Claims, 6 Drawing Sheets

RADIATION FAILURE INSPECTING METHOD AND RADIATION FAILURE INSPECTING APPARATUS

This application claims priority to Japanese Patent Application No. 2011-036039, filed Feb. 22, 2011 which is expressly incorporated herein by reference.

BACKGROUND

1. Technical Field

The present invention relates to a radiation failure inspecting method and a radiation failure inspecting apparatus.

2. Related Art

There are known image forming apparatuses that use ink (hereinafter, referred to as ultraviolet curable ink) cured when ultraviolet rays are emitted. Such image forming apparatuses include, for example, a head that ejects the ultraviolet curable ink or a radiation unit that radiates the ultraviolet curable ink on a sheet with ultraviolet rays (for example, see JP-A-2004-82452).

However, the measurement area of a general illuminometer that measures the radiation intensity of the ultraviolet rays is narrow. On the other hand, the radiation unit includes a plurality of radiation sections (for example, LED packages) serving as a light source of ultraviolet rays. Therefore, when a radiation failure of the radiation units is inspected by an illuminometer, the measurement has to be performed a plurality of times, thereby spending a lot of time inspecting the radiation failure.

SUMMARY

An advantage of some aspects of the invention is that it provides a technique of shortening the inspection time of a radiation failure.

According to an aspect of the invention, there is provided a radiation failure inspecting method in a radiation unit including a plurality of radiation sections that each emit light to cure photo-curable ink and are arranged two-dimensionally in a predetermined direction and a direction intersecting the predetermined direction and emitting the light to the photo-curable ink on a medium while being moved in the predetermined direction relative to the medium. The radiation failure inspecting method includes: acquiring read data when a scanner reads a radiation surface of the radiation unit in a state where a reading surface of the scanner faces the radiation surface of the radiation unit and the radiation unit emits the light; acquiring a value corresponding to a radiation energy of the light from the radiation unit by integrating the read data in a direction corresponding to the predetermined direction on the read data; and determining that a radiation failure occurs in the radiation unit when the value corresponding to the radiation energy of the light is equal to or less than a threshold value.

BRIEF DESCRIPTION OF THE DRAWINGS

The invention will be described with reference to the accompanying drawings, wherein like numbers reference like elements.

DESCRIPTION OF EXEMPLARY EMBODIMENTS

Overview of Disclosure

Figure 1A:
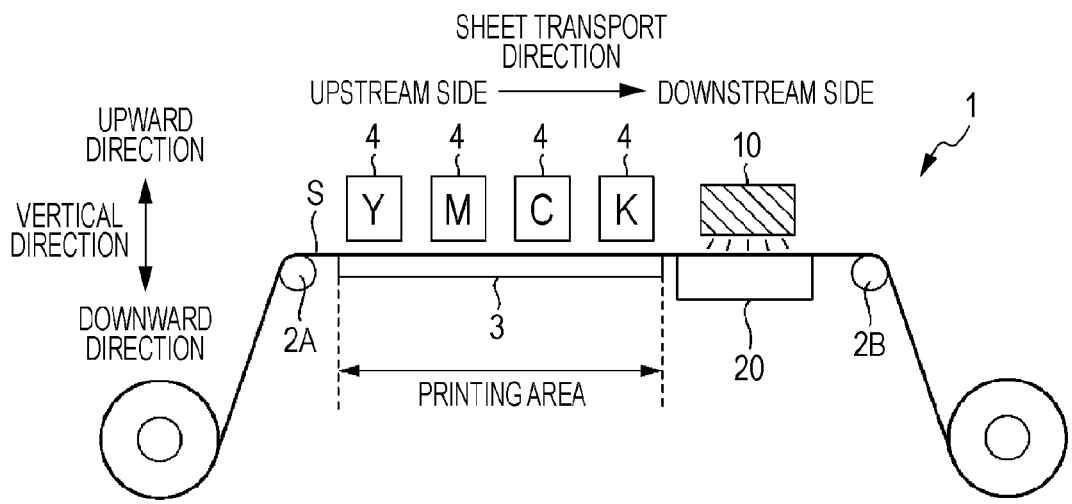
FIG. 1A is a schematic sectional view illustrating a printer and FIG. 1B is a diagram illustrating the lower surface of a radiation unit.

At least the following aspects are apparent from the description of the specification and the accompanying drawings.

According to an aspect of the invention, there is provided a radiation failure inspecting method in a radiation unit including a plurality of radiation sections that each emit light to cure photo-curable ink and are arranged two-dimensionally in a predetermined direction and a direction intersecting the predetermined direction and emitting the light to the photo-curable ink on a medium while being moved in the predetermined direction relative to the medium. The radiation failure inspecting method includes: acquiring read data when a scanner reads a radiation surface of the radiation unit in a state where a reading surface of the scanner faces the radiation surface of the radiation unit and the radiation unit emits the light; acquiring a value corresponding to a radiation energy of the light from the radiation unit by integrating the read data in a direction corresponding to the predetermined direction on the read data; and determining that a radiation failure occurs in the radiation unit when the value corresponding to the radiation energy of the light is equal to or less than a threshold value.

According to the radiation failure inspecting method, it is possible to shorten the inspection time of the radiation failure. Further, it is possible to prevent the radiation failure from being unnecessarily determined to occur in the radiation unit.

The radiation failure inspecting method according to the aspect of the invention may further include specifying at least one of positions of the radiation unit, in which the radiation failure occurs, in the predetermined direction and the direction intersecting the predetermined direction based on the read data, when the value corresponding to the radiation energy of the light is equal to or less than the threshold value.

According to the radiation failure inspecting method, the radiation failure of the radiation unit can be resolved by changing the radiation section in which the radiation failure occurs.

In the radiation failure inspecting method according to the aspect of the invention, the radiation unit may be provided in an image forming apparatus that includes a head ejecting the photo-curable ink to a continuous medium. The radiation failure of the radiation unit may be inspected whenever the continuous medium is changed.

According to the radiation failure inspecting method, it is possible to prevent an image from being formed when the radiation failure occurs in the radiation unit. Thus, it is possible to prevent the quality of the image from deteriorating.

In the radiation failure inspecting method according to the aspect of the invention, the radiation unit may be provided in an image forming apparatus that includes a head ejecting the photo-curable ink to a continuous medium. The radiation failure of the radiation unit may be inspected for each image formation job.

According to the radiation failure inspecting method, it is possible to prevent an image from being formed when the radiation failure occurs in the radiation unit. Thus, it is possible to prevent the quality of the image from deteriorating.

In the radiation failure inspecting method according to the aspect of the invention, the scanner may be a scanner of a reduced optical system.

According to the radiation failure inspecting method, the state of the radiation surface can be clearly read even when the radiation surface of the radiation unit is somewhat distant from the reading surface of the scanner.

In the radiation failure inspecting method according to the aspect of the invention, the scanner may include a sensor that receives light from the reading surface. The quantity of light incident on the sensor may be decreased so as to be smaller than the quantity of light emitted from the radiation surface.

According to the radiation failure inspecting method, it is possible to prevent the sensor from entering a saturation state. Thus, it is possible to acquire the read data corresponding to the quantity of light emitted from the radiation surface.

According to another aspect of the invention, there is provided a radiation failure inspecting apparatus in a radiation unit including a plurality of radiation sections that each emit light to cure photo-curable ink and are arranged two-dimensionally in a predetermined direction and a direction intersecting the predetermined direction and emitting the light to the photo-curable ink on a medium while being moved in the predetermined direction relative to the medium. The radiation failure inspecting apparatus includes: a scanner that faces a radiation surface of the radiation unit and reads the radiation surface when the radiation unit emits the light; and a control unit that acquires a value corresponding to a radiation energy of the light from the radiation unit by integrating read data, which are acquired when the scanner reads the radiation surface, in a direction corresponding to the predetermined direction on the read data and that determines that a radiation failure occurs in the radiation unit when the value corresponding to the radiation energy of the light is equal to or less than a threshold value.

In the radiation failure inspecting apparatus, it is possible to shorten the inspection time of the radiation failure. Further, it is possible to prevent the radiation failure from being unnecessarily determined to occur in the radiation unit.

Printer

Figure 1B:
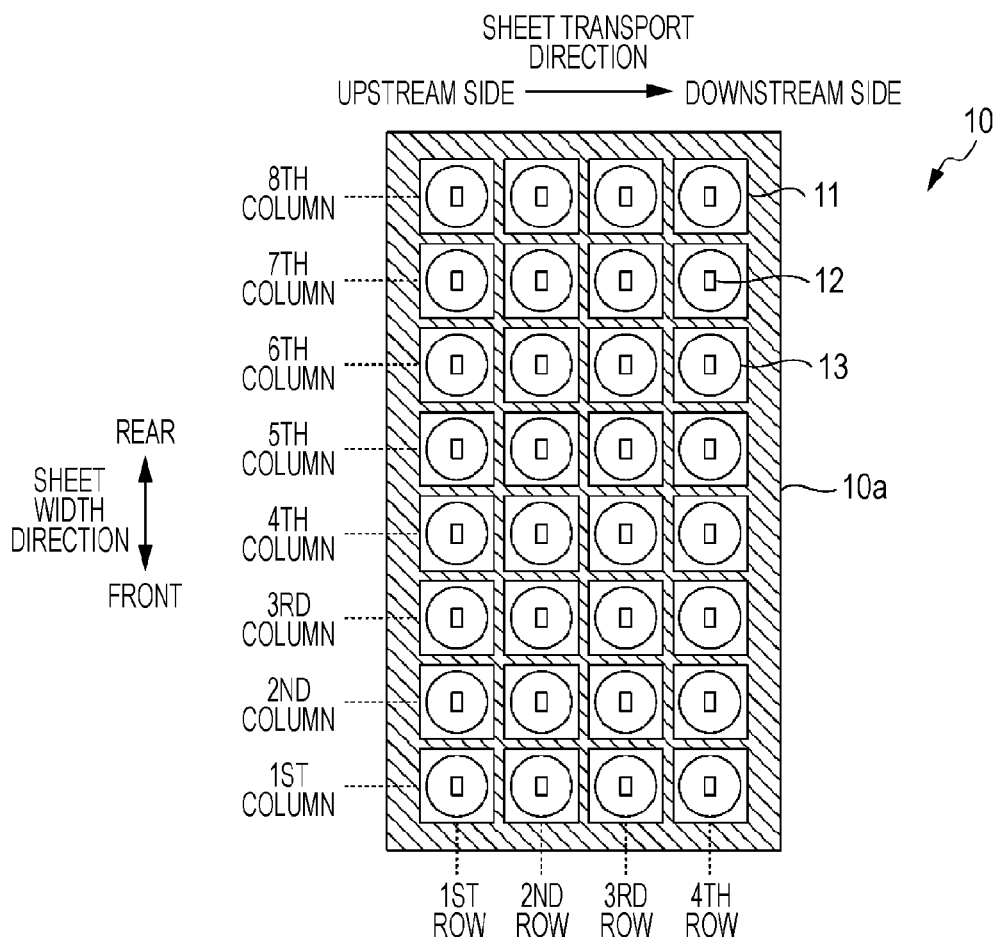

FIG. 1A is a schematic sectional view illustrating a printer 1. FIG. 1B is a diagram illustrating the lower surface of a radiation unit 10. In this embodiment, an ink jet printer (the printer 1) will be described as an example of an "image forming apparatus." The printer 1 forms an image on a medium using ink (which corresponds to "photo-curable ink" and is referred to as "UV ink" below) cured through ultraviolet ray (light) radiation. The UV ink is ink that contains an ultraviolet curable resin. When the ultraviolet curable resin is radiated with ultraviolet rays, a photo-polymerization reaction occurs, and thus the UV ink is cured. The printer 1 uses a roll sheet S wound in a roll shape as a medium. The medium is not limited to paper, but may be a film or a cloth, or a cut sheet.

Hereinafter, an image forming method performed by the printer 1 will be described. First, the roll sheet S wound in the roll shape is supplied to a printing area by transport rollers 2A and 2B or the like and is transported at a constant speed without stopping from the upstream side to the downstream side of a sheet transport direction. The roll sheet S faces heads 4 in the printing area while being held from the rear surface side by a platen 3.

The heads 4 eject the UV ink to the roll sheet S. In the printer 1 shown in FIG. 1A, the head 4 ejecting yellow UV ink, the head 4 ejecting magenta UV ink, the head 4 ejecting cyan UV ink, and the head 4 ejecting black UV ink are arranged sequentially from the upstream side of the sheet transport direction.

On the lower surface (surface facing the roll sheet S) of each head 4, a plurality of nozzles ejecting the UV ink are arranged in parallel at a predetermined interval in a sheet width direction intersecting the sheet transport direction (which is not illustrated). Accordingly, a plurality of dot lines along the sheet transport direction are printed in parallel in the sheet width direction to form a two-dimensional image on the roll sheet S by ejecting the UV ink from the heads 4 when the roll sheet S passes below the heads 4.

Thereafter, the roll sheet S faces the radiation unit 10, while being held from the rear surface side by a scanner unit 20. The radiation unit 10 cures the UV ink by radiating the UV ink on the roll sheet S being moved in the sheet transport direction with ultraviolet rays. The scanner unit 20 (which corresponds to a scanner) reads a radiation surface 10a of the radiation unit 10 when the scanner unit 20 faces the radiation surface 10a of the radiation unit 10 (which will be described below in detail).

The radiation unit 10 uses a light-emitting diode (LED) as a light source of the ultraviolet rays. On the radiation surface 10a of the radiation unit 10, as shown in FIG. 1B, a plurality of LED packages 11 (which correspond to radiation sections) emitting the ultraviolet rays are arranged two-dimensionally in the sheet transport direction (which corresponds to a predetermined direction) and the sheet width direction (which corresponds to a direction intersecting the predetermined direction).

In this embodiment, four LED packages 11 are lined in the sheet transport direction and eight LED packages 11 are lined in the sheet width direction. Thus, a total of thirty two LED packages 11 are arranged in the radiation unit 10. In order to facilitate the description, the first row number, the second row number, and the like are given to the LED packages 11 from the LED package 11 on the most upstream side of the sheet transport direction and the first column number, the second column number, and the like are given to the LED packages 11 from the LED package 11 on the frontmost side of the sheet width direction.

Each LED package 11 includes an LED element 12 emitting the ultraviolet rays and a sealing section 13 sealing the LED element 12. Each LED package 11 may includes a single LED element 12 or a plurality of LED elements 12. Further, the length of the radiation unit 10 in the sheet width direction is equal to the length of the heads 4 in the sheet width direction. In the entire area to which the UV ink is ejected from the heads 4, the UV ink is radiated with the ultraviolet rays.

In this way, the UV ink is ejected on the roll sheet S by the heads 4 and the UV ink on the roll sheet S is radiated and cured with the ultraviolet rays by the radiation unit 10, so that a process of forming an image on the roll sheet S is completed. Finally, the roll sheet S on which the image is formed is wound again in the roll shape.

Radiation Failure Inspecting Method

Radiation Failure of Radiation Unit 10

A radiation failure may occur in the LED packages 11 of the radiation unit 10 due to the life-span or a malfunction. The radiation failure refers to a case where the LED packages 11 do not emit ultraviolet rays (do not light up) or a case where the radiation intensity ($mW/cm^2$) of the ultraviolet rays is weaker than a defined value. Accordingly, when the radiation failure occurs in the LED packages 11, the UV ink on the roll sheet S passing below the LED packages 11 in which the radiation failure occurs is not completely cured.

The respective UV ink droplets on the roll sheet S face four LED packages 11, while being transported to the downstream side of the sheet transport direction. When all of the four LED packages 11 facing the UV ink droplets are normal, the radiation energy (mJ/cm$^{2t}$, the accumulated radiation amount of ultraviolet ray per about unit area) of the radiation rays emitted to the UV ink droplets is sufficient, so that the UV ink droplets are completely cured. Further, the radiation energy (mJ/cm$^2$) is determined by a product of the radiation intensity (mW/cm$^2$) and a radiation time (s) of the ultraviolet rays.

However, when the radiation failure occurs in some of the four LED packages 11 facing the UV ink droplets, the radiation energy of the radiation rays emitted to the UV ink droplets is not sufficient. Thus, the UV ink droplets may be incompletely cured. For this reason, the quality of an image may deteriorate since a portion where the UV ink is incompletely cured may be viewed as a stripe or the incompletely cured UV ink droplets may be peeled from the roll sheet S.

Accordingly, the printer 1 performs a process of inspecting the radiation failure of the radiation unit 10 periodically.

Scanner Unit 20

Figure 2:
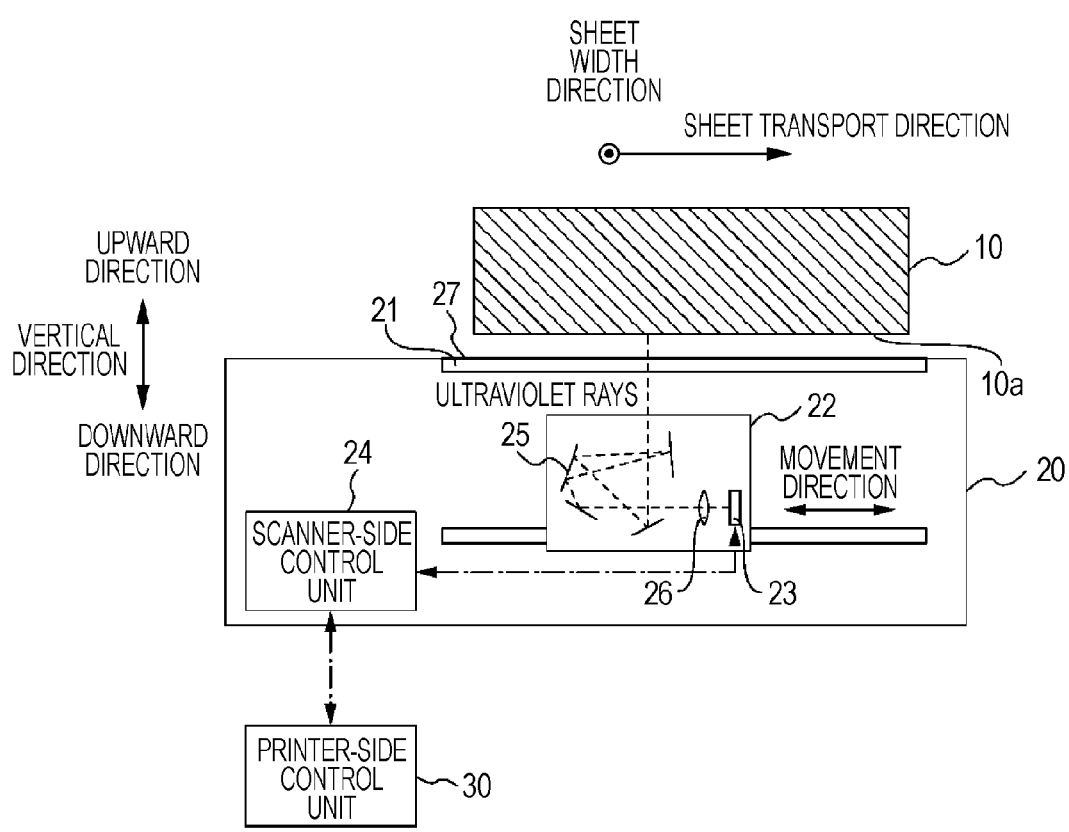
FIG. 2 is a diagram illustrating a scanner unit.

FIG. 2 is a diagram illustrating the scanner unit 20. As described above, the scanner unit 20 reads the radiation surface 10a of the radiation unit 10. The scanner unit 20 includes a reading surface 21 (glass plate), a carriage 22 that is moved in a movement direction, a line sensor 23 (which corresponds to a sensor), and a scanner-side control unit 24.

In the line sensor 23 (for example, a CCD line sensor), light-receiving elements are lined in a direction intersecting the movement direction of the carriage 22. Each light-receiving element converts incident light (light from the reading surface 21) into a charge in accordance with the quantity (light intensity) of the incident light and accumulates the charges. Then, the line sensor 23 transmits the charge accumulated in each light-receiving element as an electric signal to the scanner-side control unit 24 at a predetermined timing.

The scanner unit 20 is a scanner of a reduced optical system. Not only the line sensor 23 but also a plurality of reflecting mirrors 25 and a condensing lens 26 are installed in the carriage 22. Accordingly, the light incident on the reading surface 21 is reflected from the reflecting mirrors 25, is guided to the condensing lens 26, is converged by the condensing lens 26, and then is incident on the line sensor 23 in the converged state.

A dimmer filter 27 is attached to the reading surface 21 of the scanner unit 20. Accordingly, the quantity of light (amount of ultraviolet ray) incident on the line sensor 23 from the reading surface 21 via the dimmer filter 27 is smaller than the quantity of light (amount of ultraviolet ray) emitted toward the reading surface 21 of the scanner unit 20 by the radiation unit 10.

The scanner unit 20 is a color scanner and outputs the read data as RGB data. Accordingly, for example, R (Red), G (Green), and B (Blue) filters are installed in the line sensor 23, so that the scanner unit 20 is configured to separate colors.

In the printer 1, the sheet transport direction is identical with the movement direction of the carriage 22 of the scanner unit 20, and thus the sheet width direction is identical with the direction intersecting the movement direction of the carriage 22. Since the scanner unit 20 is located below the radiation unit 10 (see FIG. 1A), the positions of the scanner unit 20 and the radiation unit 10 are substantially the same as each other in the sheet width direction. Accordingly, the reading surface 21 of the scanner unit 20 faces the radiation surface 10a of the radiation unit 10 with the roll sheet S interposed therebetween. Further, the size of the reading surface 21 of the scanner unit 20 is equal to or larger than the size of the radiation surface 10a of the radiation unit 10.

Radiation Failure Inspecting Method

Figure 3:
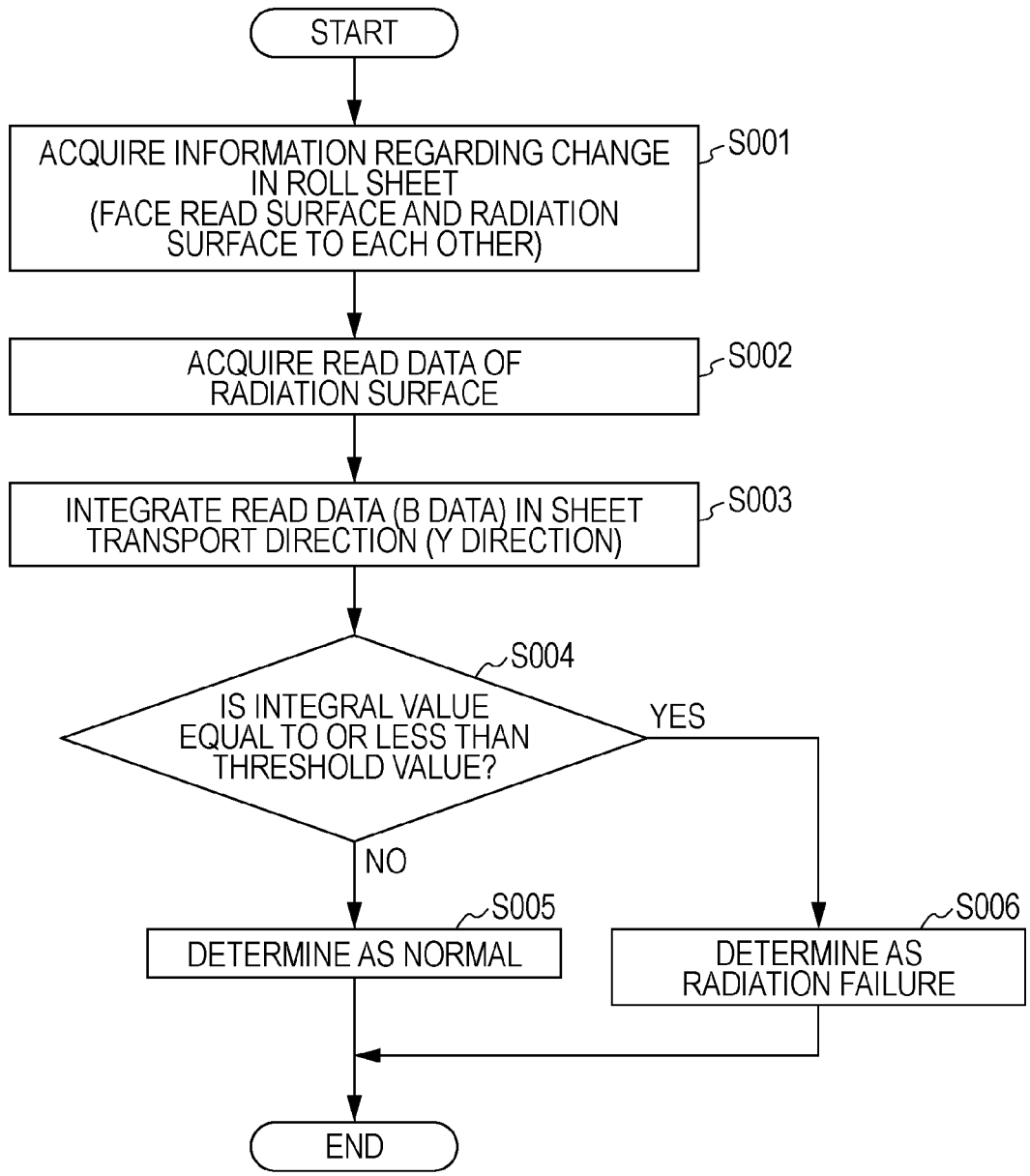
FIG. 3 is a flowchart illustrating a radiation failure inspecting method of the radiation unit.

FIG. 3 is a flowchart illustrating the radiation failure inspecting method in the radiation unit 10. Here, a case will be described in which a control unit (hereinafter, referred to as a printer-side control unit 30) of the printer 1 inspects a radiation failure when a user uses the printer 1. However, the invention is not limited thereto. For example, a radiation failure may be inspected in a process of manufacturing the printer 1 or a user may inspect a radiation failure.

In this embodiment, it is assumed that the radiation failure inspecting process is performed whenever the roll sheet S is changed. Therefore, when the printer-side control unit 30 acquires information regarding the change of the roll sheet S (S001), the printer-side control unit 30 starts inspecting a radiation failure. In the printer 1 according to this embodiment, as shown in FIG. 2, the reading surface 21 of the scanner unit 20 faces the radiation surface 10a of the radiation unit 10 with no roll sheet interposed therebetween when the roll sheet S is detached from the printer 1. That is, the scanner unit 20 can read the radiation surface 10a of the radiation unit 10.

Next, when the radiation unit 10 radiates the UV ink with the ultraviolet rays (that is, all of the LED packages 11 light up), the printer-side control unit 30 allows the scanner unit 20 to read the radiation surface 10a of the radiation unit 10 at a predetermined read resolution. Then, the line sensor 23 reads (receives the light (ultraviolet rays) from the radiation surface 10a) the entire region of the radiation surface 10a, while the line sensor 23 is moved in the movement direction (the sheet transport direction) along with the carriage 22. In this way, the printer-side control unit 30 allows the scanner unit 20 to acquire the read data read from the radiation surface 10a of the radiation unit 10 (S002).

When the electric signal (that is, an electric signal corresponding to the quantity of light (the radiation energy of the ultraviolet rays) emitted from the radiation surface 10a) received by the line sensor 23 is transmitted from the line sensor 23 to the scanner-side control unit 24, the scanner-side control unit 24 performs a predetermined process (for example, an AD conversion process) on the received electric signal. As a consequence, the electric signal from the line sensor 23 is converted into the read data in which pixels determined in accordance with the read resolution are two-dimensionally arranged. The printer-side control unit 30 acquires the read data, in which the pixels are two-dimensionally arranged, from the scanner-side control unit 24.

The respective pixels of the read data represent gray scale values that indicate the quantity of light (that is, the quantity of light (the radiation energy of the ultraviolet rays) emitted from the radiation surface 10a) received at the positions of the respective pixels by the line sensor 23 in multiple stages. The greater the gray scale values represented by the pixels are, the larger the quantity of light received by the line sensor 23 is. Moreover, the smaller the gray scale values represented by the pixels are, the less the quantity of light received by the line sensor 23 is. Here, the gray scale values represented by the pixels are 256 gray scale values (0 to 255).

The UV ink on the roll sheet S passing below the radiation unit 10 is influenced not only by the ultraviolet rays emitted from the LED packages 11 located immediately above the UV ink but also by the ultraviolet rays emitted from the neighborhood LED packages 11. Accordingly, the scanner unit 20 reads the radiation surface 10a when all of the LED packages 11 of the radiation unit 10 light up. In this way, it is possible to acquire the read data close to the radiation energy of the ultraviolet rays actually emitted to the UV ink on the roll sheet S.

In general, when the scanner unit reads an image or the like printed on a sheet, a lamp of the scanner unit radiates the image with light and the line sensor receives the light reflected from the image. Accordingly, when a general scanner unit including a lamp is used, the lamp is turned off and the scanner unit reads the radiation surface 10a of the radiation unit 10.

In this embodiment, as shown in FIG. 2, the scanner unit 20 reads the radiation surface 10a when a gap through which the roll sheet S passes is empty between the radiation surface 10a of the radiation unit 10 and the reading surface 21 of the scanner unit 20. However, the invention is not limited thereto. For example, the scanner unit 20 may read the radiation surface 10a when the reading surface 21 is in close contact with the radiation surface 10a. In this case, however, at least one of the scanner unit 20 and the radiation unit 10 is configured to be vertically variable.

Figure 4:
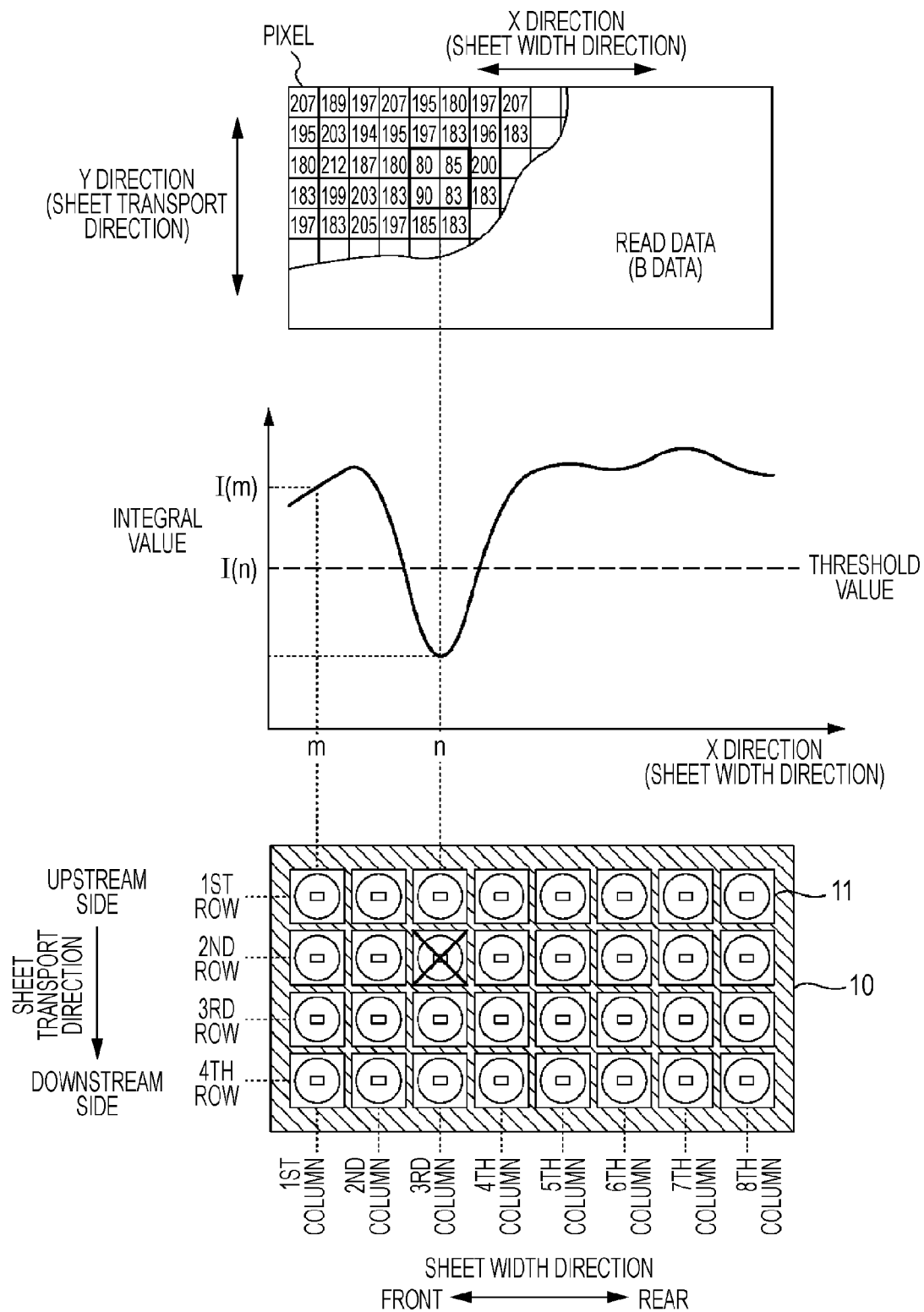
FIG. 4 is a diagram illustrating read data of a radiation surface acquired by the scanner unit.

FIG. 4 is a diagram illustrating the read data of the radiation surface 10a acquired by the scanner unit 20. The scanner unit 20 is a color scanner and the printer-side control unit 30 acquires RGB data as the read data from the scanner unit 20. The color of the light emitted by the radiation unit 10 according to this embodiment is close to blue (B) among RGB. That is, B data (data obtained by reading blue light) is data obtained by reading more light from the radiation unit 10. Accordingly, the printer-side control unit 30 uses the B data among RGB read data in the following process.

As described above, the gray scale values indicating the quantity of light received by the line sensor 23 are lined two-dimensionally in the read data (the upper part drawing of FIG. 4) that the printer-side control unit 30 acquires from the scanner unit 20. Here, in order to facilitate the description, a direction corresponding to the sheet width direction of the printer 1 is referred to as an X direction and a direction corresponding to the sheet transport direction is referred to as a Y direction on the read data.

The printer-side control unit 30 integrates the read data (B data) in the Y direction (the sheet transport direction) and acquires the integral value (S003). In this embodiment, the gray scale values represented by the respective pixels belonging to each of the pixel columns lined in the Y direction in the read data are integrated for each pixel column and the integrated value of the gray scale values is set as an integral value. As a consequence, an integral result (graph) shown in the middle part drawing of FIG. 4 can be obtained. The horizontal axis of the graph represents a position in the X direction (the sheet width direction) and the vertical axis represents the acquired integral value.

As shown in the lower part drawing of FIG. 4, it is supposed that a radiation failure occurs in the LED package 11 at the 2nd row and the 3rd column among the LED packages 11 of the radiation unit 10. That is, the radiation energy (the quantity of light) of the ultraviolet rays emitted to the UV ink passing below the four LED packages 11 located at the 3rd column is small, and thus the UV ink is incompletely cured.

In this case, as shown in the upper part drawing of FIG. 4, the gray scale values represented by the pixels (pixels within a thick frame) read by the LED package 11 at the 2nd row and the 3rd column in which the radiation failure occurs are less than the gray scale values represented by the other pixels. Accordingly, as shown in the middle part drawing of FIG. 4, an integral value I(n) at a position n of the X direction corresponding to the 3rd column of the sheet width direction in the read data is a small value.

On the contrary, all of the four LED packages 11 located at the first column in the sheet width direction are normal. Therefore, the radiation energy (the quantity of light) of the ultraviolet rays emitted to the UV ink passing below the four LED packages 11 is large and the UV ink is completely cured. Further, since the gray scale values represented by the pixels read by the normal LED packages 11 are large values, an integral value I(m) at a position m of the X direction corresponding to the 1st column of the sheet width direction in the read data is a large value.

That is, the gray scale value represented by each pixel of the read data is the gray scale value indicating the quantity of light received by the line sensor 23 at the position of each pixel, that is, the gray scale value indicating the radiation energy of the ultraviolet rays emitted from the radiation surface 10a. Therefore, the integral value obtained by integrating the read data in the Y direction (the sheet transport direction) is the value corresponding to the radiation energy (the sum value of the radiation energies) of the ultraviolet rays emitted from four LED packages 11 lined in the sheet transport direction.

In other words, the integral value at a given position in the X direction in the read data is the value corresponding to the radiation energy of the ultraviolet rays emitted to the UV ink passing below the position of the radiation unit 10 in the sheet width direction which corresponds to the given position in the X direction.

Then, the printer-side control unit 30 compares the integral value obtained by integrating the read data in the Y direction (the sheet transport direction) to a threshold value (S004).

The printer-side control unit 30 determines that a radiation failure occurs in the radiation unit 10, in other words, there is the integral value equal to or less than the threshold value (S006), when the integral value is equal to or less than the threshold value (Yes in S004), that is, when there is a portion in which the radiation energy of the ultraviolet rays emitted from four LED packages 11 lined in the sheet transport direction is small.

On the other hand, the printer-side control unit 30 determines that the radiation unit 10 is normal (S005), when the integral value is greater than the threshold value, in other words, there is no integral value equal to or less than the threshold value (No in S004), that is, the radiation energy of the ultraviolet rays emitted from four LED packages 11 lined in the sheet transport direction is equal to or greater than a defined amount.

It is assumed that the threshold value compared to the integral value is determined in a process of designing the printer 1 and is stored in the printer 1. For example, the threshold value can be determined as follows. First, the radiation energy of given four LED packages 11 is acquired using an illuminometer. Then, the four LED packages 11 are read by the scanner unit 20, and the integral value is acquired by integrating the read data. The threshold value is determined so that the UV ink is completely cured when the integral value is greater than the threshold value based on the radiation energy and the integral value acquired in this way.

A conversion equation used to convert the read data (the gray scale values represented by the pixels) into the radiation energy may be calculated based on the radiation energy of the four LED packages 11 acquired from the illuminometer and the read data of the four LED packages 11 acquired by the scanner unit 20. Then, the conversion equation may be used when the read data are integrated in the Y direction (the sheet transport direction).

In the radiation failure inspecting method of the radiation unit 10 according to this embodiment, as described above, the reading surface 21 of the scanner unit 20 faces the radiation surface 10a of the radiation unit 10. When the radiation unit 10 emits light (ultraviolet rays), the scanner unit 20 reads the radiation surface 10a. The integral value (the value corresponding to the radiation energy of the light from the radiation unit) is acquired by integrating the read data in the Y direction (the sheet transport direction). When the integral value is equal to or less than the threshold value, it is determined that the radiation failure occurs in the radiation unit 10.

For example, in the method of inspecting the radiation failure of the radiation unit 10 by measuring the radiation intensity of each LED package 11 using the illuminometer, it takes a considerable time to inspect the radiation failure, and thus the process is also complicated. In the radiation failure inspecting method according to this embodiment, however, the scanner unit 20 reads the radiation surface 10a of the radiation unit 10 once. Accordingly, the inspection time of the radiation failure can be shortened and the process can be facilitated.

For example, in a method of inspecting a radiation failure of the radiation unit 10 based on the value of a current flowing in the LED packages 11, there is a concern that an inspection accuracy may be lowered due to the influence of the deterioration or the like of the sealing section 13. In the radiation failure inspecting method according to this embodiment, however, the radiation state of the radiation surface 10a can be inspected more accurately since the scanner unit 20 directly reads the radiation surface 10a of the radiation unit 10.

When the radiation energy (the quantity of light) of the ultraviolet rays emitted from four LED packages 11 lined in the sheet transport direction is equal to or greater than the defined amount, the UV ink passing below the four LED packages is completely cured. Accordingly, in the radiation failure inspecting method according to this embodiment, it is possible to acquire the integral value as "the value corresponding to the radiation energy of the ultraviolet energy emitted from four LED packages 11 lined in the sheet transport direction", in other words, "the value corresponding to the radiation energy of the ultraviolet rays emitted to the UV ink on the roll sheet S moving in the sheet transport direction below the radiation unit 10", by integrating the read data of the radiation surface 10a in the Y direction (the sheet transport direction). Moreover, it is possible to prevent a radiation failure from being unnecessarily determined to occur in the radiation unit 10 by comparing the integral value to the threshold value and determining the radiation failure.

That is, in the radiation failure inspecting method according to this embodiment, the integral value becomes equal to or greater than the threshold value, when the radiation failure occurs in any one of four LED packages 11 lined in the sheet transport direction, but the entire radiation energy can be supplemented by other LED packages 11. Accordingly, since it is determined that the radiation failure does not occur in the radiation unit 10, it is possible to prevent the radiation failure from being unnecessarily determined to occur. Therefore, since the number of maintenance processes of the radiation unit 10 can be reduced, the burden on the user can be reduced. Further, the LED packages 11 can be efficiently used.

In the radiation failure inspecting method according to this embodiment, the radiation failure is inspected in the radiation unit 10 whenever the roll sheet S (continuous medium) is changed. Thus, an image can be formed on a new roll sheet S when it is inspected whether a radiation failure occurs in the radiation unit 10. Accordingly, the image is prevented from being formed on the roll sheet S when the radiation failure occurs in the radiation unit 10. Thus, it is possible to prevent the quality of the image from deteriorating.

Since the lifespan of the LED packages 11 is relatively long, there is a low probability that a radiation failure occurs while an image is formed. Therefore, it is possible to relatively reduce the number of inspection processes by inspecting the radiation failure whenever the roll sheet S is changed.

In a case where the reading surface 21 of the scanner unit 20 faces the radiation surface 10a of the radiation unit 10 with the roll sheet S interposed therebetween as in the printer 1 according to this embodiment, the scanner unit 20 can read the radiation surface 10a when the roll sheet S is detached to change the roll sheet S. That is, it is not necessary to detach the roll sheet S only to inspect a radiation failure.

In the radiation failure inspecting method according to this embodiment, the scanner unit 20 is a scanner of a reduced optical system. The depth of field is deep in the scanner of a reduced optical system. Therefore, the state of the radiation surface 10a (the LED packages 11) can be clearly read even when the radiation surface 10a (the LED packages 11) of the radiation unit 10 is somewhat distant from the reading surface 21 of the scanner unit 20.

Thus, when it is determined that a radiation failure occurs in the radiation unit 10, it is easy to specify the position of the LED package 11 in which the radiation failure occurs based on the image data obtained by reading the radiation surface 10a (which is described below in FIG. 5C). Further, since it is not necessary to bring the radiation surface 10a (the LED packages 11) into close contact with the reading surface 21 of the scanner unit 20, for example, the freedom of design is improved in regard to the positions of the LED packages 11 in the radiation unit 10 or the mounting position of the scanner unit 20.

When the quantity of light incident on the line sensor 23 exceeds the saturation value of the line sensor 23, the line sensor 23 becomes a saturation state in which the output value (the electric signal corresponding to the quantity of light) of the line sensor 23 is not changed. Accordingly, in the radiation failure inspecting method according to this embodiment, the dimmer filter 27 is attached to the reading surface 21 of the scanner unit 20 to reduce the quantity of light incident on the line sensor 23 so that the quantity of light is smaller than the quantity of light emitted by the radiation surface 10a of the radiation unit 10.

Thus, even when the quantity of light (the radiation energy of the ultraviolet rays) emitted from the radiation surface 10a of the radiation unit 10 is large, it is possible to reduce the quantity of light incident on the line sensor 23, thereby preventing the line sensor 23 from entering the saturation state. Accordingly, since the read data corresponding to the quantity of light (the radiation energy of the ultraviolet rays) emitted from the radiation surface 10a can be acquired, it is possible to improve the inspection accuracy of the radiation failure. Further, the invention is not limited to the case where the dimmer filter 27 is provided on the reading surface 21. For example, the dimmer filter 27 may be provided at a certain position between the reading surface 21 and the line sensor 23.

In the radiation failure inspecting method according to this embodiment, the radiation failure is inspected using the data (data with the closest wavelength) of a color which is the closest to the color of the light emitted by the radiation unit 10 among the RGB read data output by the scanner unit 20. Here, since the color of the light emitted by the radiation unit 10 is close to blue, the radiation failure is determined based on the B data.

Thus, for example, it is not necessary to provide a filter through which only light (here, the ultraviolet rays) emitted by the radiation unit 10 passes. Accordingly, since a general scanner unit can be used in the inspection of a radiation failure, the cost can be reduced.

Maintenance Process

Figure 5A:
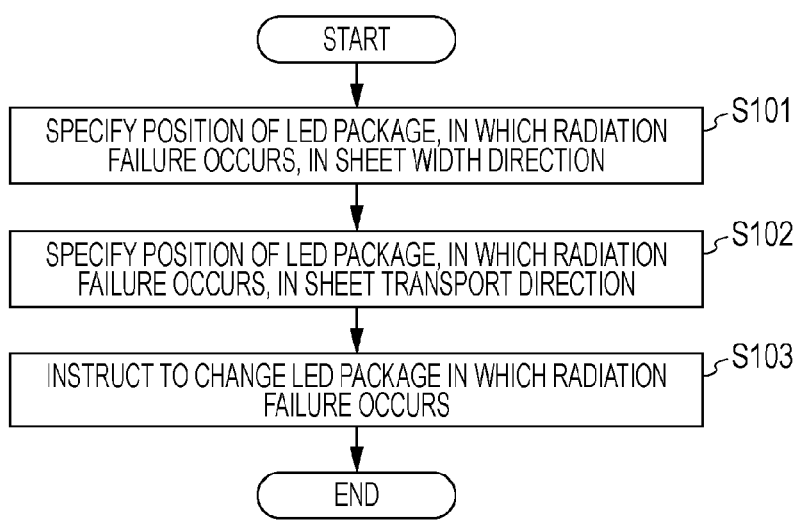
FIGS. 5A to 5C are diagrams illustrating a maintenance process when the radiation unit fails to radiate.
Figure 5B:
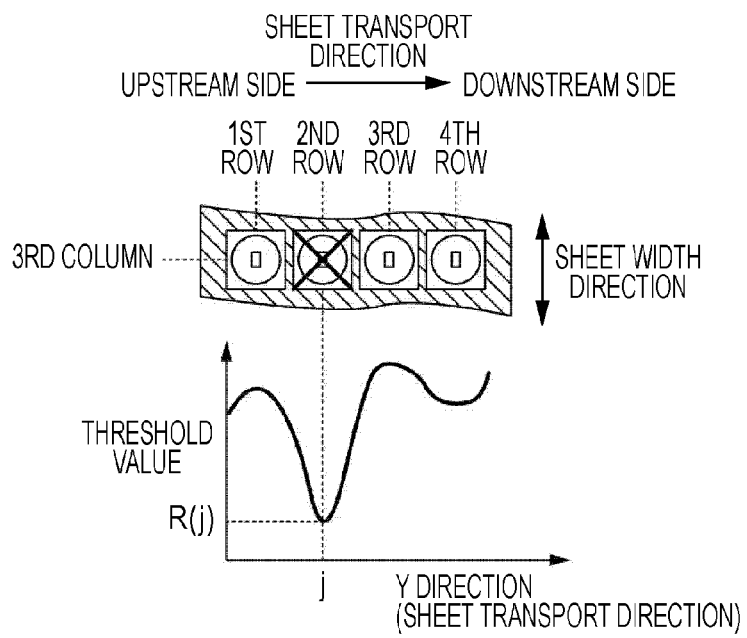
Figure 5C:
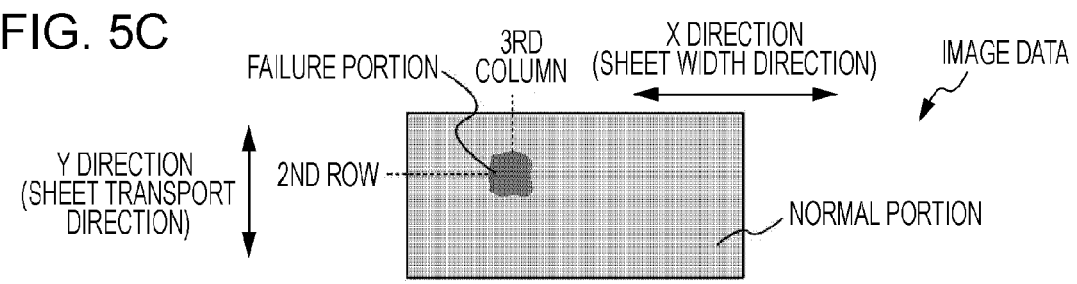

FIGS. 5A to 5C are diagrams illustrating a maintenance process when a radiation failure occurs in the radiation unit 10. When it is determined that the radiation unit 10 is normal in the above-described inspecting process, the printer-side control unit 30 informs a user that the radiation unit 10 is normal. When the user changes the roll sheet S, the printer can print an image. On the other hand, when it is determined that the radiation failure occurs in the radiation unit 10, the printer-side control unit 30 performs a process of the flowchart shown in FIG. 5A.

First, the printer-side control unit 30 specifies the position of the LED package 11, in which the radiation failure occurs, in the sheet width direction (S101). Thus, the printer-side control unit 30 acquires the position of a pixel column in the X direction in which the integral value is equal to or less than the threshold value based on the data (shown in the middle part drawing of FIG. 4) obtained by integrating the read data (the B data) of the radiation unit 10 in the Y direction (the sheet transport direction). For example, based on the middle part drawing of FIG. 4, the printer-side control unit 30 acquires the position "n" of the pixel column, in which the integral value is equal to or less than the threshold value, in the X direction.

Then, the printer-side control unit 30 acquires the "3rd column" of the sheet width direction corresponding to the position "n" of the X direction on the read data in the radiation unit 10. In this way, the printer-side control unit 30 specifies the "3rd column" as the position of the LED package 11, in which the radiation failure occurs, in the sheet width direction.

Next, the printer-side control unit 30 specifies the position of the LED package 11, in which the radiation failure occurs, in the sheet transport direction (S102). Thus, the printer-side control unit 30 acquires the data of the pixel column, in which the integral value is equal to or less than the threshold value, among the read data (the data before the integration in the upper part drawing of FIG. 4) of the radiation unit 10.

FIG. 5B is a graph for describing the data of the pixel column (the pixel column in which the position in the X direction is n) in which the integral value is equal to or less than the threshold value. The horizontal axis of the graph represents the position in the Y direction (the sheet transport direction) and the vertical axis represents the gray scale value (the gray scale value indicating the quantity of light received by the line sensor 23) of each pixel. The printer-side control unit 30 acquires a position "j" of the pixel with the smallest gray scale value in the Y direction among the data of the pixel column in which the integral value is equal to or less than the threshold value.

Then, the printer-side control unit 30 acquires the "2nd row" of the sheet transport direction corresponding to the position "j" in the Y direction on the read data in the radiation unit 10. In this way, the printer-side control unit 30 specifies the "2nd row" as the position of the LED package 11, in which the radiation failure occurs, in the sheet transport direction.

Finally, the printer-side control unit 30 informs the user of the position (here, the 3rd column and the 2nd row) in the sheet width direction and the sheet transport direction of the LED package 11 in which the radiation failure occurs and instructs the user to change the LED package 11 in which the radiation failure occurs (S103).

When the user changes the LED package 11 in which the radiation failure occurs, the radiation failure of the radiation unit 10 is resolved, and thus the UV on the roll sheet S passing below the radiation unit 10 can be completely cured. Further, after the user changes the LED package 11 in which the radiation failure occurs, the radiation failure inspecting process (FIG. 3) may be performed again to conform that the radiation failure of the radiation unit 10 is resolved.

The method of specifying the position of the LED package 11 in which the radiation failure occurs is not limited thereto, but another method may be used. For example, as shown in FIG. 5C, the position of the LED package 11 in which the radiation failure occurs may be specified based on the image data obtained by reading the radiation surface 10a of the scanner unit 20.

The brightness of a portion (a normal position in the drawing) of the image data obtained by reading the normal LED package 11 is different from that of a portion (a failure portion in the drawing) of the image data obtained by reading the LED package 11 in which the radiation failure occurs. Accordingly, it is possible to specify the position of the LED package 11, in which the radiation failure occurs, by allowing the position of the failure portion in the X and Y directions in the image data to correspond to the position in the sheet width direction and the sheet transport direction in the radiation unit 10.

The invention is not limited to the change of the LED package 11 in which the radiation failure occurs. For example, the radiation intensity of each LED package 11 may be made to be variable so as to increase the radiation intensity of the LED packages 11 (that is, the LED packages 11 at the same position in the sheet width direction) at the same column as that of the LED package 11 in which the radiation failure occurs.

In this way, even when the radiation failure occurs in any one of four LED packages 11 lined in the sheet transport direction, the radiation energy of the ultraviolet rays emitted to the UV ink passing below the other LED packages 11 can be set to be equal to or greater than the defined amount due to the fact that the radiation energy of the ultraviolet rays from the other LED packages 11 increases. In this case, only the position (the position of the column) of the LED package 11, in which the radiation failure occurs, in the sheet width direction may be specified.

In this way, when there is the integral value equal to or less than the threshold value among the integral values obtained by integrating the read data of the radiation surface 10a in the Y direction (the sheet transport direction) by the scanner unit 20, at least one of the positions of the LED package 11, in which the radiation failure occurs, in the sheet transport direction and the sheet width direction may be specified based on the read data of the radiation surface 10a.

In this way, the radiation failure of the radiation unit 10 can be resolved by performing a maintenance process such as the process of changing the LED package 11 in which the radiation failure occurs. Further, since the UV ink on the roll sheet S can be completely cured, it is possible to prevent the quality of an image from deteriorating.

Modifications

Figure 6:
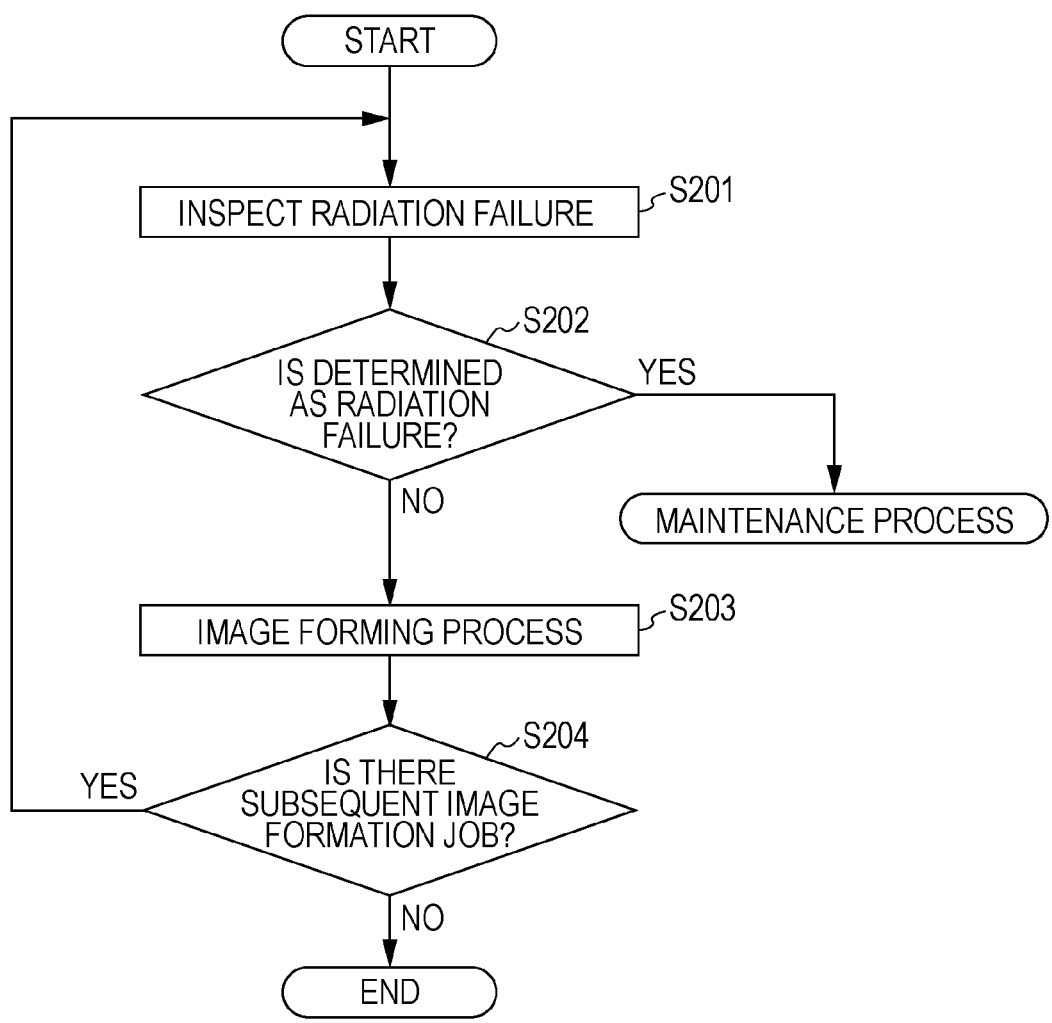
FIG. 6 is a flowchart illustrating an image forming process according to a modification.

FIG. 6 is a flowchart illustrating an image forming process according to a modification. In the above-described embodiment, the process of inspecting the radiation failure of the radiation unit 10 is performed whenever the roll sheet S is changed. However, the invention is not limited thereto. As in the modification of FIG. 6, the radiation failure may be inspected for each image formation job.

Specifically, when the printer-side control unit 30 receives an image formation job, the printer-side control unit 30 performs the above-described radiation failure inspecting process (FIG. 3) (S201). When it is determined that the radiation failure occurs in the radiation unit 10 (Yes in S202), the printer-side control unit 30 informs the user that the user has to perform a maintenance process. On the other hand, when it is determined that the radiation failure does not occur in the radiation unit 10 (No in S202), the printer-side control unit 30 performs an image forming process based on the received image formation job (S203). Thereafter, when the subsequent image formation job is present (Yes in S204), the printer-side control unit 30 inspects the radiation failure again, and then performs the image forming process.

In this way, by inspecting the radiation failure for each image formation job, it is possible to prevent an image from being formed when the radiation failure occurs in the radiation unit 10. Thus, it is possible to prevent the quality of an image from deteriorating. Further, in the printer 1 (see FIG. 1A) according to the above-described embodiment, the radiation unit 10 faces the scanner unit 20 with the roll sheet S interposed therebetween. Therefore, when the radiation failure is inspected for each image formation job, the scanner unit 20 may be disposed outside the image formation area (which is an area through which the roll sheet S passes) in the sheet width direction. Further, before the radiation failure is inspected, the radiation unit 10 may be moved in the sheet width direction so that the radiation unit 10 faces the scanner unit 20.

In the above-described embodiment, the scanner of the reduced optical system is used as the scanner unit 20, but the invention is not limited thereto. A scanner of a close contact optical system may be used. Since a line sensor having the same length as the width of a reading range is used in the scanner of the close contact optical system, a complicated optical path is not necessary. Thus, the miniaturization of the apparatus and power consumption reduction can be realized. Further, in the scanner of the close contact optical system, the radiation surface 10a is read when the radiation surface 10a of the radiation unit 10 is brought into close contract with the reading surface. Therefore, the line sensor can receive the light (ultraviolet rays) emitted from the radiation surface 10a more reliably. Accordingly, the radiation failure of the radiation unit 10 can be determined based on the read data close the quantity of light (the radiation energy of the ultraviolet rays) emitted from the radiation surface 10a.

In the above-described embodiment, the scanner unit 20 reads the radiation surface 10a when the sheet transport direction of the radiation unit 10 is identical with the movement direction of the carriage 22 of the scanner unit 20. However, the invention is not limited thereto. The scanner unit 20 may read the radiation surface 10a when the sheet width direction of the radiation unit 10 is identical with the movement direction of the carriage 22.

However, when the amount of charge accumulated in the line sensor 23 of the scanner unit 20 is large and the line sensor 23 can accumulate the amount of charge used to read the entire surface of the radiation surface 10a, the sheet transport direction of the radiation unit 10 may be identical with the movement direction of the carriage 22 (the line sensor 23). In this way, the amount of charge accumulated by each light-receiving element of the line sensor 23 corresponds to the integral value obtained by integrating the read data in the Y direction (the sheet transport direction). Accordingly, the radiation failure of the radiation unit 10 can be determined by comparing the amount of charge accumulated by each light-receiving element to the threshold value. Thus, since the process of the read data can be easily performed, it is possible to shorten the inspection time of the radiation failure.

In the above-described embodiment, the dimmer filter 27 is provided in the scanner unit 20 in order to prevent the amount of light incident on the line sensor 23 from exceeding the saturation value since the quantity of light emitted from the radiation unit 10 is large. However, the invention is not limited thereto. For example, the charge accumulation time of the line sensor 23 (light-receiving element) may be shortened.

In the above-described embodiment, the radiation failure of the radiation unit 10 is inspected using the scanner unit 20 mounted in the printer 1. However, the invention is not limited thereto. For example, the radiation failure may be inspected using a scanner separated from the printer 1. Further, the scanner unit 20 mounted in the printer 1 is used to inspect the radiation failure and, for example, may be also used to inspect the quality of an image or inspect a check pattern of a defective nozzle. Thus, the number of components in the printer 1 can be reduced, thereby reducing the cost.

A general scanner may be used to inspect the radiation failure or a dedicated "radiation failure inspecting apparatus" may be used. Further, the dedicated radiation failure inspecting apparatus includes a scanner that reads the radiation surface 10a of the radiation unit 10 and a control unit that integrates the read data in a direction corresponding to the sheet transport direction in the read data and determines the radiation failure of the radiation unit when the integral value is equal to or less than the threshold value.

In the above-described embodiment, the LED package 11 is used as the light source (radiation section) emitting the ultraviolet rays, but the invention is not limited thereto. For example, a metal halide lamp or a mercury lamp may be used. Further, only one radiation unit 10 is installed in the printer 1 according to the above-described embodiment, but the invention is not limited thereto. For example, a temporary radiation unit emitting ultraviolet rays to the extent that the UV ink is not completely cured may be provided between the heads 4 and a main radiation unit completely curing the UV ink may be provided on the downstream side of the sheet transport direction. Thus, it is possible to prevent different color ink ejected from the respective heads 4 from permeating and being mixed with each other. In this case, the above-described radiation failure inspecting process may be performed on both the temporary radiation unit and the main radiation unit.

Other Embodiments

In this embodiment, the radiation failure inspecting method has mainly been described, but the invention includes the disclosure of a radiation failure inspecting apparatus and the like. Further, the embodiment has hitherto been described to facilitate the understanding of the invention, but the invention should not be construed as being limited. The invention can be modified and improved without departing from the gist of the invention. Of course, the equivalents of the invention are included. In particular, an embodiment described below is also included in the invention.

Radiation Unit

In the above-described embodiment, the ultraviolet curable ink has hitherto been used as an example of photo-curable ink that is cured by the radiation unit, but the invention is not limited thereto. For example, a radiation unit emitting the visible light may be used for ink that is cured by the emitted visible light.

What is claimed is:

1. A radiation failure inspecting method in a radiation unit including a plurality of radiation sections that each emit light to cure photo-curable ink and are arranged two-dimensionally in a predetermined direction and a direction intersecting the predetermined direction and emitting the light to the photo-curable ink on a medium while being moved in the predetermined direction relative to the medium, the radiation failure inspecting method comprising:

scanning a radiation surface of the radiation unit to acquire red, green, and blue (RGB) data as read data in a state where a reading surface of the scanner faces the radiation surface of the radiation unit and the radiation unit emits the light;

integrating the read data in a direction corresponding to the predetermined direction on the read data to acquire a value corresponding to a radiation energy of the light from the radiation unit; and determining that a radiation failure occurs in the radiation unit when the value corresponding to the radiation energy of the light is equal to or less than a threshold value.

2. The radiation failure inspecting method according to claim 1, further comprising:

specifying at least one of positions of the radiation unit, in which the radiation failure occurs, in the predetermined direction and the direction intersecting the predetermined direction based on the read data, when the value corresponding to the radiation energy of the light is equal to or less than the threshold value.

3. The radiation failure inspecting method according to claim 1, wherein the radiation unit is provided in an image forming apparatus that includes a head ejecting the photo-curable ink to a continuous medium, and wherein the radiation failure of the radiation unit is inspected whenever the continuous medium is changed.

4. The radiation failure inspecting method according to claim 1, wherein the radiation unit is provided in an image forming apparatus that includes a head ejecting the photo-curable ink to a continuous medium, and wherein the radiation failure of the radiation unit is inspected for each image formation job.

5. The radiation failure inspecting method according to claim 1, wherein the scanner is a scanner of a reduced optical system.

6. The radiation failure inspecting method according to claim 1, wherein the scanner includes a sensor that receives light from the reading surface, and wherein the quantity of light incident on the sensor is decreased so as to be smaller than the quantity of light emitted from the radiation surface.

7. A radiation failure inspecting apparatus in a radiation unit including a plurality of radiation sections that each emit light to cure photo-curable ink and are arranged two-dimensionally in a predetermined direction and a direction intersecting the predetermined direction and emitting the light to the photo-curable ink on a medium while being moved in the predetermined direction relative to the medium, the radiation failure inspecting apparatus comprising:

a scanner that faces a radiation surface of the radiation unit and reads the radiation surface when the radiation unit emits the light; and a control unit that controls the scanner to acquire red, green, and blue (RGB) data as read data and that integrates the read data to acquire a value corresponding to a radiation energy of the light from the radiation unit, wherein the read data is acquired when the scanner reads the radiation surface, in a direction corresponding to the predetermined direction on the read data, wherein the control unit determines that a radiation failure occurs in the radiation unit when the value corresponding to the radiation energy of the light is equal to or less than a threshold value.

* * * * *